United States Patent
Lin et al.

(10) Patent No.: US 11,310,145 B1
(45) Date of Patent: Apr. 19, 2022

(54) APPARATUS, SYSTEM, AND METHOD FOR ACHIEVING SHORTEST PATH FORWARDING IN CONNECTION WITH CLUSTERS OF ACTIVE-STANDBY SERVICE APPLIANCES

(71) Applicant: Juniper Networks, Inc., Sunnyvale, CA (US)

(72) Inventors: Wen Lin, Sunnyvale, CA (US); John E. Drake, Sunnyvale, CA (US)

(*) Notice: Subject to any disclaimer, the term of this patent is extended or adjusted under 35 U.S.C. 154(b) by 0 days.

(21) Appl. No.: 17/005,985

(22) Filed: Aug. 28, 2020

(51) Int. Cl.
*H04L 12/751* (2013.01)
*H04L 12/741* (2013.01)
*H04L 12/721* (2013.01)
*H04L 45/02* (2022.01)
*H04L 45/00* (2022.01)
*H04L 45/12* (2022.01)

(52) U.S. Cl.
CPC .............. *H04L 45/02* (2013.01); *H04L 45/12* (2013.01); *H04L 45/54* (2013.01)

(58) Field of Classification Search
CPC combination set(s) only.
See application file for complete search history.

(56) References Cited

U.S. PATENT DOCUMENTS

| | | | |
|---|---|---|---|
| 10,212,075 B1* | 2/2019 | Lakshmikanthan | H04L 12/4679 |
| 2010/0085972 A1* | 4/2010 | Yan | H04L 45/22 370/392 |
| 2015/0172130 A1* | 6/2015 | Colla | G06F 9/45533 709/223 |
| 2017/0201389 A1* | 7/2017 | Tiruveedhula | H04L 45/745 |
| 2017/0222881 A1* | 8/2017 | Holbrook | H04L 43/0835 |
| 2018/0241824 A1* | 8/2018 | He | H04L 67/141 |
| 2020/0162362 A1* | 5/2020 | Deb | H04L 45/04 |

* cited by examiner

Primary Examiner — Xavier S Wong
(74) Attorney, Agent, or Firm — FisherBroyles, LLP

(57) ABSTRACT

A disclosed method may include (1) identifying, by a PE router, a conditional advertisement policy that requires installation of at least one address of an active service appliance within a routing table to trigger advertising a route for the active service appliance to one or more additional PE routers, (2) inspecting the routing table for the installation of the address of the active service appliance, (3) determining, based at least in part on the inspection, that the address of the active service appliance is installed in the routing table, (4) determining that the PE router has satisfied the conditional advertisement policy due at least in part to the address of the active service appliance being installed in the routing table, and then in response, (5) directing the PE router to advertise the route to the additional PE routers. Various other apparatuses, systems, and methods are also disclosed.

20 Claims, 6 Drawing Sheets

```
Code Snippet
    500

**************************** condition-policy local-VIP-Exist {
    Check if the VIP host route of the service appliance is installed by EVPN in the IP VRF table
    Return true or false accordingly
} bgp import policy bgp-advertise-type-5 {
    if (local-VIP-Exist) {
        accept advertise 0.0.0.0/0 route;
    }
    If (other type-5 policy goes here) {
        ...
        accept;
    }
    else reject;
}

APPARATUS, SYSTEM, AND METHOD FOR ACHIEVING SHORTEST PATH FORWARDING IN CONNECTION WITH CLUSTERS OF ACTIVE-STANDBY SERVICE APPLIANCES

BACKGROUND

Some service appliances (such as firewalls and/or load-balancers) may run and/or operate static routing protocols, as opposed to dynamic routing protocols. In some examples, Provider Edge (PE) routers connected to such service appliances may advertise the static default routes of those service appliances to other PE routers. By doing so, the PE routers connected to such service appliances may attract and/or draw traffic destined for those service appliances.

In one example, a cluster of active-standby service appliances may include an active service appliance and a backup service appliance. In this example, both the active service appliance and the backup service appliance may share and/or be configured with the same Virtual Internet Protocol (VIP) address even though only one is active at any given time. Similarly, both the active service appliance and the backup service appliance may share and/or be configured with the static default route, which effectively points to and/or directs applicable traffic to the cluster of active-standby service appliances. If the active service appliance experiences a failure, the backup service appliance will be activated to assume the responsibility of providing one or more functionalities in connection with applicable traffic.

In certain conventional clustered service technologies and/or configurations, all the PE routers connected to the cluster of active-standby service appliances may advertise the static default route for the active and backup service appliances to other PE routers. As a result, those other PE routers may build Equal Cost Multipaths (ECMPs) to the service cluster. Based the applied hash algorithm, one or more of those PE routers may end up choosing a path that is not the shortest available path to the service cluster, thereby leading to and/or resulting in suboptimal forwarding efficiency and/or performance. For example, one of the other PE routers may opt to forward traffic destined for the active service appliance to the PE router connected to the backup service appliance. In this example, the PE router connected to the backup service appliance may then have to forward the traffic to the PE router connected to the active service appliance.

The instant disclosure, therefore, identifies and addresses a need for additional and improved apparatuses, systems, and methods for achieving shortest path forwarding in connection with clusters of active-standby service appliances.

SUMMARY

As will be described in greater detail below, the instant disclosure generally relates to apparatuses, systems, and methods for achieving shortest path forwarding in connection with clusters of active-standby service appliances. In one example, a method for accomplishing such a task may include (1) identifying, by a PE router of a network, a conditional advertisement policy that requires installation of at least one address of an active service appliance within a routing table to trigger advertising a route for the active service appliance to one or more additional PE routers of the network, (2) inspecting the routing table of the PE router for the installation of the address of the active service appliance, (3) determining, based at least in part on the inspection of the routing table, that the address of the active service appliance is installed in the routing table, (4) determining that the PE router has satisfied the conditional advertisement policy due at least in part to the address of the active service appliance being installed in the routing table, and then in response to determining that the PE router has satisfied the conditional advertisement policy, (5) directing the PE router to advertise the route for the active service appliance to the additional PE routers of the network.

Similarly, a system that implements the above-identified method may include a physical processing device configured to execute various modules stored in memory at a PE router. In one example, this system may include and/or execute (1) an identification module that identifies a conditional advertisement policy that requires installation of at least one address of an active service appliance within a routing table to trigger advertising a route for the active service appliance to one or more additional PE routers of the network, (2) an inspection module that inspects the routing table of the PE router for the installation of the address of the active service appliance, (3) a determination module that (A) determines, based at least in part on the inspection of the routing table, that the address of the active service appliance is installed in the routing table and (B) determines that the PE router has satisfied the conditional advertisement policy due at least in part to the address of the active service appliance being installed in the routing table, and (4) an advertising module that advertises the route for the active service appliance to the additional PE routers of the network.

Additionally or alternatively, an apparatus that implements the above-identified method may include a storage device that stores a conditional advertisement policy that requires installation of at least one address of an active service appliance within a routing table to trigger advertising a route for the active service appliance to one or more PE routers of a network. This apparatus may also include at least one physical processing device communicatively coupled to the storage device. This physical processing device may (1) identify the conditional advertisement policy stored in the storage device, (2) inspect the routing table for the installation of the address of the active service appliance, (3) determine, based at least in part on the inspection of the routing table, that the address of the active service appliance is installed in the routing table, (4) determine that the conditional advertisement policy is satisfied due at least in part to the address of the active service appliance being installed in the routing table, and then in response to determining that the conditional advertisement policy is satisfied, (5) advertise the route for the active service appliance to the PE routers of the network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary code snippet that facilitates performing inspections as to whether a conditional advertisement policy has been satisfied.

Figure 1:
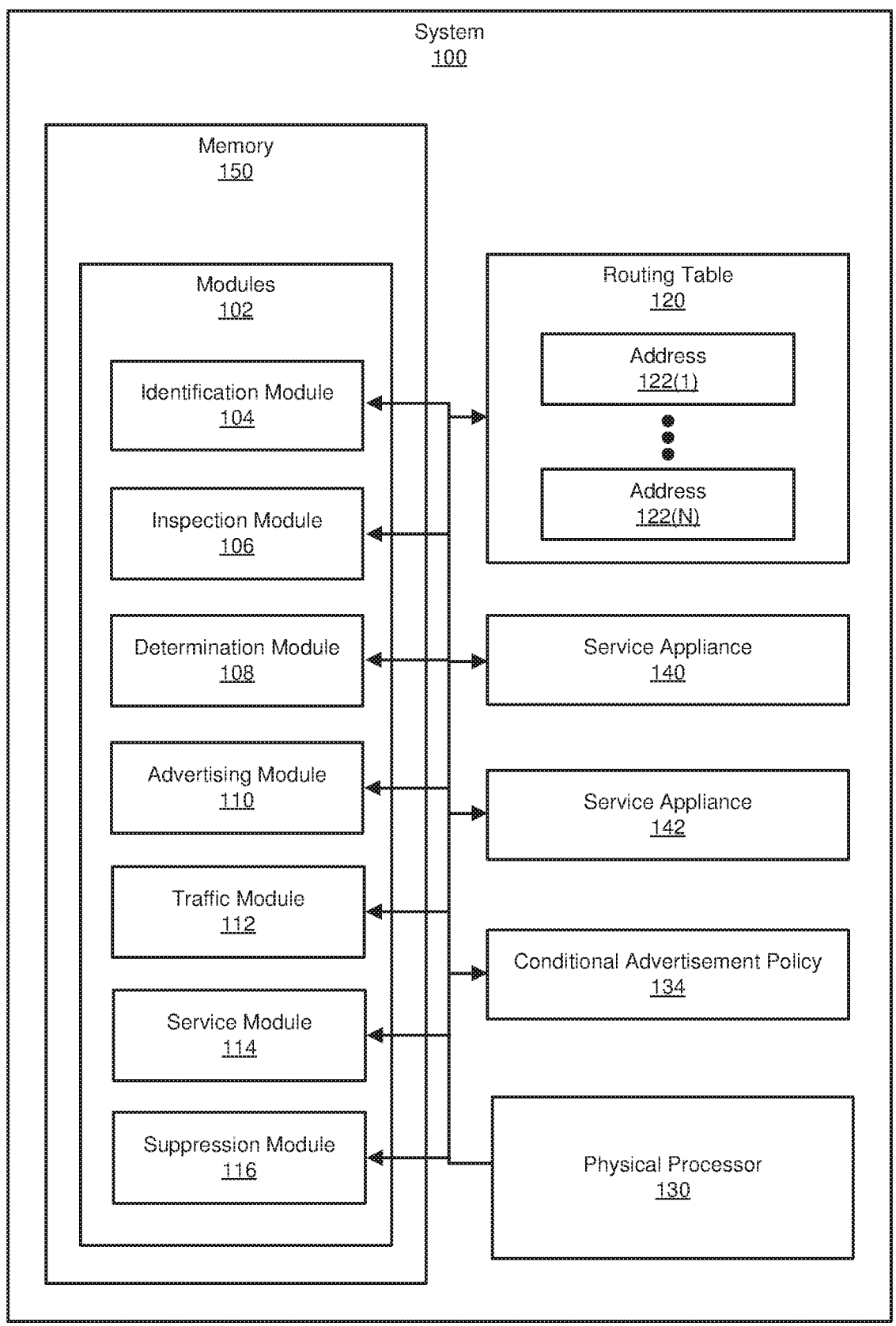
FIG. 1 is a block diagram of an exemplary system for achieving shortest path forwarding in connection with clusters of active-standby service appliances.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for achieving shortest path forwarding in connection with clusters of active-standby service appliances coupled to a pair of EVPN PE routers in single-home mode through a Layer 2 bridge domain. As will be explained in greater detail below, the various apparatuses, systems, and methods described herein may enable PE routers connected to a cluster of active-standby service appliances (such as firewalls and/or load-balancers) to ensure that other PE routers forward traffic destined for the active service appliance along the shortest path. To do so, the various apparatuses, systems, and methods described herein may cause the PE router connected to the active service appliance to advertise the static default route for the active service appliance to the other PE routers. In addition, these various apparatuses, systems, and methods may cause the PE router connected to the backup service appliance to suppress and/or refrain from advertising the static default route for the active or backup service appliance to the other PE routers.

Accordingly, these various apparatuses, systems, and methods may direct only the PE router connected to the active service appliance to advertise the static default route to the other PE routers. By doing so, these various apparatuses, systems, and methods may effectively force the other PE routers to forward traffic to the active service appliance along the shortest available path. As a result, these various apparatuses, systems, and methods may achieve shortest path forwarding in connection with the cluster of active-standby service appliances, thus improving the forwarding efficiency and/or performance across the PE routers.

Figure 2:
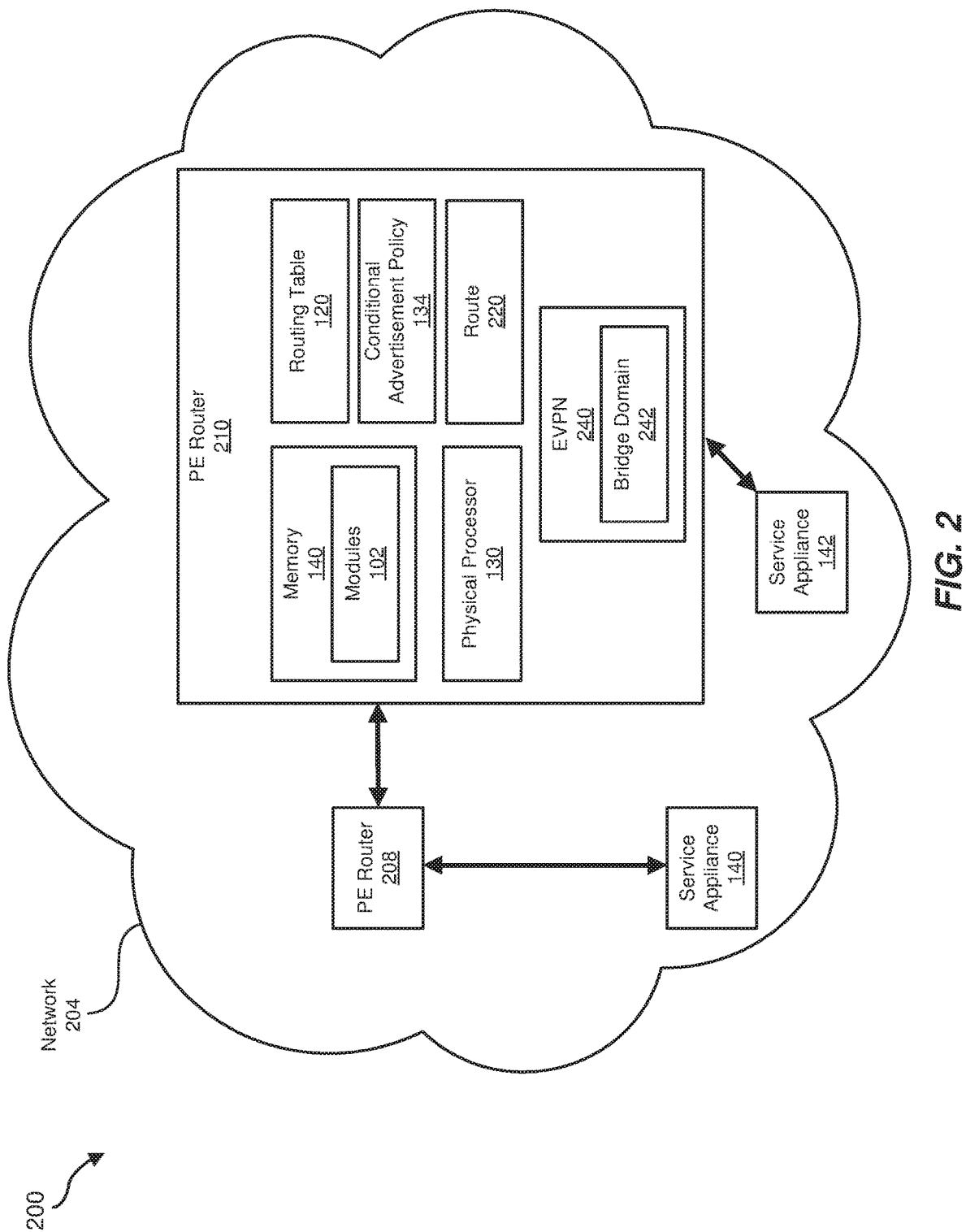
FIG. 2 is a block diagram of an exemplary system for achieving shortest path forwarding in connection with clusters of active-standby service appliances.
Figure 3:
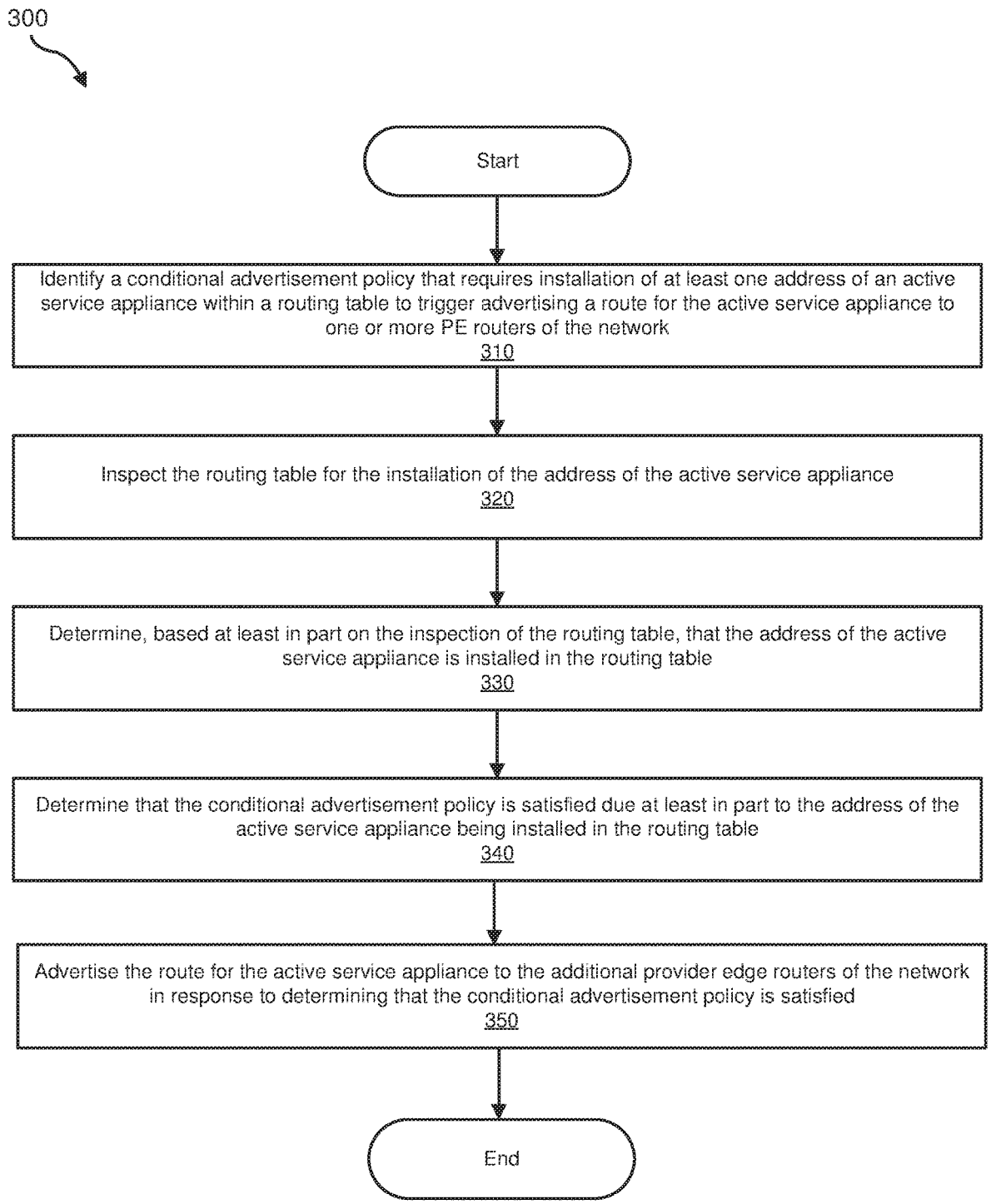
FIG. 3 is a flow diagram of an exemplary method for achieving shortest path forwarding in connection with clusters of active-standby service appliances.
Figure 4:
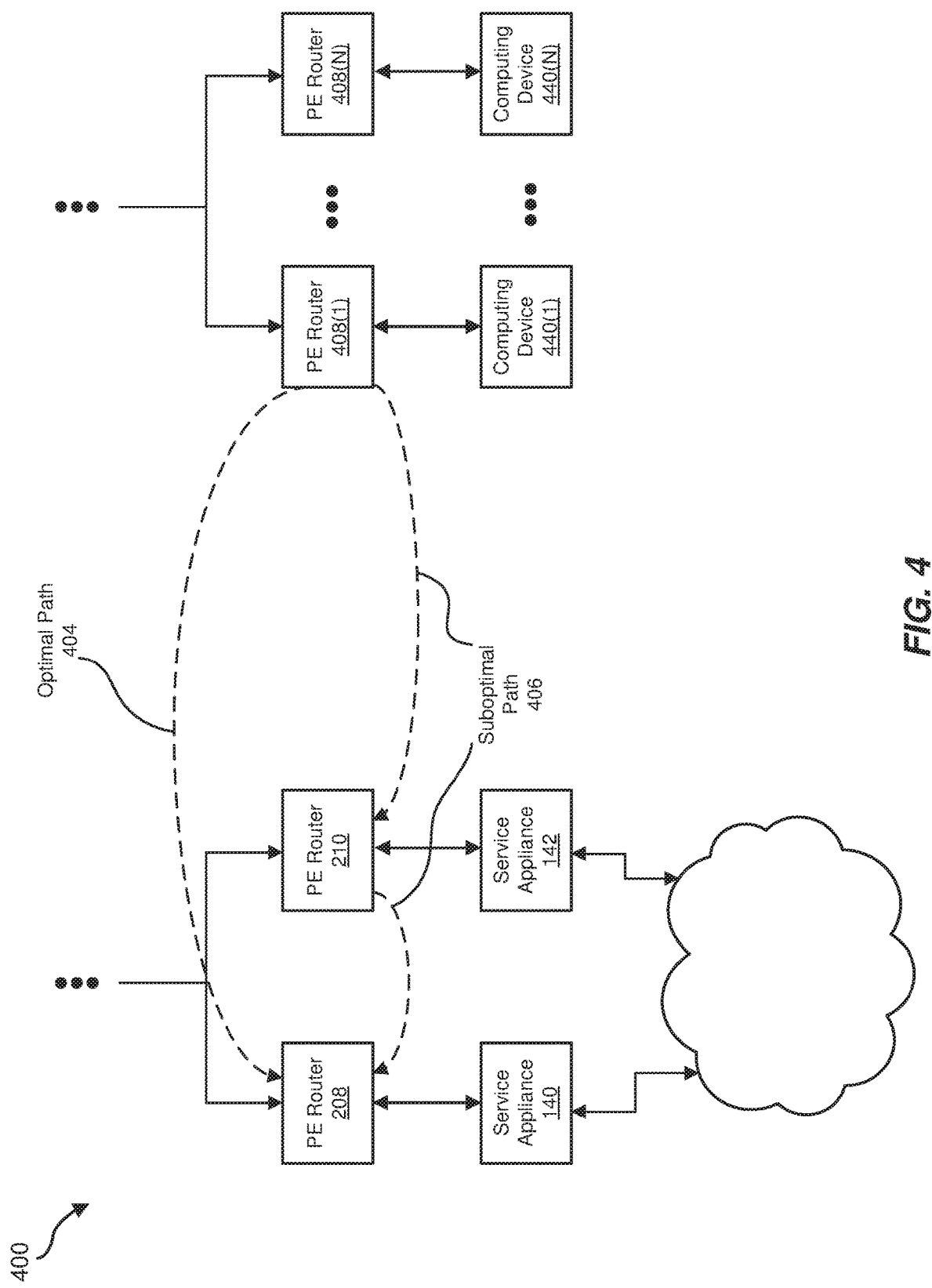
FIG. 4 is a block diagram of an exemplary system for achieving shortest path forwarding in connection with clusters of active-standby service appliances.

The following will provide, with reference to FIGS. 1, 2, and 4, detailed descriptions of exemplary apparatuses, systems, and corresponding implementations for achieving shortest path forwarding in connection with clusters of active-standby service appliances. Detailed descriptions of an exemplary method for achieving shortest path forwarding in connection with clusters of active-standby service appliances will be provided in connection with FIG. 3. Detailed descriptions of an exemplary code snippet that facilitates performing inspections as to whether a conditional advertisement policy has been satisfied. In addition, detailed descriptions of an exemplary computing system for carrying out such a method will be provided in connection with FIG. 6.

FIG. 1 shows an exemplary system 100 that facilitates achieving shortest path forwarding in connection with clusters of active-standby service appliances. As illustrated in FIG. 1, system 100 may include one or more modules 102 for performing one or more tasks. As will be explained in greater detail below, modules 102 may include an identification module 104, an inspection module 106, a determination module 108, an advertising module 110, a traffic module 112, a service module 114, and a suppression module 116. Although illustrated as separate elements, one or more of modules 102 in FIG. 1 may represent portions of a single module, application, process, and/or operating system.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., PE router 208, PE router 210, service appliance 140, and/or service appliance 142), devices illustrated in FIG. 4 (e.g., PE router 208, PE router 210, PE routers 408(1)-(N), computing devices 440(1)-(N), service appliance 140, and/or service appliance 142), and/or computing system 600 illustrated in FIG. 6. One or more of modules 102 in FIG. 1 may also represent all or portions of one or more special-purpose computers configured to perform one or more tasks.

As illustrated in FIG. 1, exemplary system 100 may also include one or more memory and/or storage devices, such as memory 150. Memory 150 generally represents any type or form of volatile or non-volatile storage device or medium capable of storing data and/or computer-readable instructions. In one example, memory 150 may store, load, and/or maintain one or more of modules 102. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processing devices, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 150. Additionally or alternatively, physical processor 130 may execute one or more of modules 102 to achieve shortest path forwarding in connection with clusters of active-standby service appliances. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include and/or represent one or more routing tables, such as routing table 120. In some examples, routing table 120 may include and/or represent a network layer Virtual Routing and Forwarding (VRF) table and/or a Layer 3 Internet Protocol (IP) VRF table. In one example, routing table 120 may include and/or represent various entries that identify and/or specify addresses 122(1)-(N). In this example, one or more of addresses 122(1)-(N) may include and/or represent a Media Access Control (MAC) address of an active service appliance. Additionally or alternatively, one or more of addresses 122(1)-(N) may include and/or represent a VIP address of the active service appliance.

As illustrated in FIG. 1, exemplary system 100 may also include and/or represent one or more service appliances, such as service appliances 140 and 142. In some examples, service appliances 140 and 142 may be grouped and/or configured as an active-standby cluster. In such examples, only one of service appliances 140 and 142 may be active at any given time. Accordingly, one of service appliances 140 and 142 may be inactive and/or serve as a backup or standby appliance at any given time. In one example, service appliances 140 and 142 may be dynamically activated and/or deactivated to provide certain failover protections and/or assurances for functionalities and/or services.

In some examples, service appliances 140 and 142 may include and/or represent software, firmware, physical hardware, and/or a combination of one or more of the same. In one example, service appliances 140 and 142 may include and/or represent firewalls. Additional examples of service appliances 140 and 142 include, without limitation, loadbalancers, network security systems, intrusion detection systems, variations or combinations of one or more of the same, and/or any other suitable service appliances.

As illustrated in FIG. 1, exemplary system 100 may also include and/or represent one or more conditional advertisement policies, such as conditional advertisement policy 134. In some examples, conditional advertisement policy 134 may define and/or represent one or more conditions and/or requirements that must be satisfied before advertising a route for the active service appliance. If a PE router has not satisfied all the necessary conditions and/or requirements defined by conditional advertisement policy 134, the PE router may be prevented and/or suppressed from advertising such a route to other PE routers. However, if a PE router has satisfied all the necessary conditions and/or requirements defined by conditional advertisement policy 134, the PE router may be able to advertise such a route to other PE routers.

In some examples, system 100 in FIG. 1 may be implemented in a variety of ways. For example, system 100 may be implemented and/or executed as an apparatus that is deployed within a network. In one example, all or a portion of exemplary system 100 may represent portions of exemplary system 200 in FIG. 2. As shown in FIG. 2, system 200 may include a network 204 that facilitates communication among various computing devices (such as PE router 208, PE router 210, service appliance 140, and/or service appliance 142).

In some examples, network 204 may include and/or represent various network devices that form and/or establish communication paths and/or segments. For example, network 204 may include and/or represent one or more segment routing and/or forwarding paths. Although not illustrated in this way in FIG. 2, system 200 may include and/or represent one or more other computing devices in addition to PE router 208, PE router 210, service appliance 140, and/or service appliance 142.

In some examples, and as will be described in greater detail below, one or more of modules 102 may cause PE router 208 and/or PE router 210 to (1) identify conditional advertisement policy 134 that requires installation of at least one address of an active service appliance within a routing table to trigger advertising a route for the active service appliance to one or more additional PE routers of the network, (2) inspect the routing table of the PE router for the installation of the address of the active service appliance, (3) determine, based at least in part on the inspection of the routing table, that the address of the active service appliance is installed in the routing table, (4) determine that the PE router has satisfied the conditional advertisement policy due at least in part to the address of the active service appliance being installed in the routing table, and then in response to determining that the PE router has satisfied the conditional advertisement policy, (5) direct the PE router to advertise the route for the active service appliance to the additional PE routers of the network.

Network 204 generally represents any medium or architecture capable of facilitating communication or data transfer. In some examples, network 204 may include other devices not illustrated in FIG. 2 that facilitate communication and/or form part of routing paths among PE router 208, PE router 210, service appliance 140, and/or service appliance 142. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

As illustrated in FIG. 2, PE router 210 may include and/or implement an EVPN 240 and/or bridge domain 242. In some examples, bridge domain 242 may represent and/or constitute the same bridge domain that learned the active appliance's MAC address and its associated VIP address. Additionally or alternatively, bridge domain 242 may represent and/or constitute a Layer 2 bridge domain. In one example, EVPN 240 may include and/or represent an EVPN module that advertised a static default route through EVPN type-5 route. In this example, PE router 210 may be unable to support EVPN Layer 2 bridge domain functionality, such as various Virtual LAN (VLAN) services defined in the Internet Engineering Task Force's (IETF's) RFC 7432, published February of 2015, titled "BGP MPLS-Based Ethernet VPN". Although not explicitly illustrated in this way in FIG. 2, PE router 208 may also include and/or implement an identical or similar EVPN and/or bridge domain as PE router 210. Accordingly, service appliances 140 and 142 may be connected to PE routers 208 and 210 in single-home mode through a Layer 2 bridge domain.

FIG. 3 is a flow diagram of an exemplary computer-implemented method 300 for achieving shortest path forwarding in connection with clusters of active-standby service appliances. The steps shown in FIG. 3 may be performed by any suitable computer-executable code and/or computing system, including system 100 in FIG. 1, system 200 in FIG. 2, computing system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a conditional advertisement policy that requires installation of at least one address of an active service appliance within a routing table to trigger advertising a route for the active service appliance to one or more PE routers of the network. For example, identification module 104 may, as part of PE router 208 or 210 in FIG. 2, identify conditional advertisement policy 134 that requires installation of at least one address of an active service appliance within routing table 120 to trigger advertising a route 220 for the active service appliance to one or more PE routers (not necessarily illustrated in FIG. 2) of network 204. In this example, the route for the active service appliance may point to and/or identify the local access interface connected to the active service appliance as the corresponding next hop within routing table 120.

In general, if the route for the active service appliance is learned locally on the PE router, the route may point to and/or identify the local access interface connecting the PE router to the active service appliance. Accordingly, in this example, because the route for the active service appliance is learned locally on the PE router, the local access interface connecting the PE router to the active service appliance may be found and/or identified in the route stored within routing table 120. The advertising of the route may involve and/or entail distributing a static default route for the PE router.

In one example, the active service appliance may include and/or represent a firewall that has been activated within a cluster of active-standby firewalls. Additionally or alternatively, the active service appliance may include and/or represent a load-balancer that has been activated within a cluster of active-standby load-balancers.

In some embodiments, the address of the active service appliance may include and/or represent a MAC address. Additionally or alternatively, the address of the active service appliance may include and/or represent a VIP address. In one embodiment, the routing table may include and/or represent a network layer VRF table.

In some embodiments, route 220 may include and/or represent an EVPN type-5 route that facilitates directing traffic to the active service appliance. Additionally or alternatively, route 220 may include and/or represent an EVPN type-2 route that facilitates directing traffic to the active service appliance.

The systems described herein may perform step 310 in a variety of ways and/or contexts. In some examples, identification module 104 may identify conditional advertisement policy 134 as conditional advertisement policy 134 is received by PE router 208 or 210. In one example, PE router 208 or 210 may receive conditional advertisement policy 134 from another device included in network 204 and/or another device (not necessarily illustrated in FIG. 2). In another example, identification module 104 may search a database and/or storage device of PE router 208 or 210 for an advertisement policy to facilitate advertising routes to one or more additional devices. During this search, identification module 104 may identify conditional advertisement policy 134, which defines one or more conditions and/or requirements that must be satisfied before advertising a route for the active service appliance.

Referring to system 200 in FIG. 2, PE router 208 may be connected directly to service appliance 140, and PE router 210 may be connected directly to service appliance 142. To achieve shortest path forwarding, system 200 may impose conditional advertisement policy 134 on PE routers 208 and 210 that restricts the advertisement of the static default route for the active service appliance to the PE router that is actually connected to the active service appliance. Accordingly, if service appliance 140 is active and service appliance 142 is standing-by, conditional advertisement policy 134 may enable PE router 208 to advertise the static default route for service appliance 140 to other PE routers (not necessarily illustrated in FIG. 2). In addition, if service appliance 140 is active and service appliance 142 is standing-by, conditional advertisement policy 134 may prevent PE router 210 from advertising the static default route for service appliance 140 or 142 to those other PE routers. Thus, PE router 210 may effectively remain silent with respect to advertising on behalf of the cluster of active-standby service appliances while service appliance 140 is active.

However, if service appliance 142 is active and service appliance 140 is standing-by, conditional advertisement policy 134 may enable PE router 210 to advertise the static default route for service appliance 142 to other PE routers (not necessarily illustrated in FIG. 2). In addition, if service appliance 142 is active and service appliance 140 is standing-by, conditional advertisement policy 134 may prevent PE router 208 from advertising the static default route for service appliance 140 or 142 to those other PE routers. Thus, PE router 208 may effectively remain silent with respect to advertising on behalf of the cluster of active-standby service appliances while service appliance 142 is active.

In one example, referring to system 200 in FIG. 2, service appliance 140 may be active and thus servicing traffic on behalf of the cluster of active-standby service appliances. Meanwhile, in this example, service appliance 142 may be inactive and thus standing-by to assume the servicing responsibilities with respect to such traffic in the event that service appliance 140 fails and/or goes down. In other words, in this example, service appliance 140 may be the active one, and service appliance 142 may be the backup.

Continuing with this example, PE router 208 may learn the MAC address and/or VIP address of service appliance 140 locally from an access interface (per, e.g., certain EVPN processes). Upon learning the MAC address and/or VIP address of service appliance 140 in this way, PE router 208 may install the VIP host route and/or address for service appliance 140 in its routing table. In one example, PE router 208 may advertise an EVPN type-2 route to PE router 210. However, PE router 210 may disregard and/or suppress the EVPN type-2 route advertised by PE router 208 based at least in part on conditional advertisement policy 134. As a result, PE router 210 may fail and/or refuse to learn or install the VIP host route and/or address for service appliance 140. Additionally or Alternatively, PE router 210 may prevent the address of service appliance 140 from being installed in routing table 120 despite learning the address of service appliance 140 via the EVPN type-2 route advertised by PE router 208.

Further, because service appliance 142 is not active, PE router 210 may fail and/or refuse to learn the MAC address and/or VIP address of service appliance 142 based at least in part on conditional advertisement policy 134. As a result, PE router 210 may fail and/or refuse to install the VIP host route and/or address for service appliance 142 in routing table 120.

In some examples, the PE router connected to the active service appliance may configure the static default route (e.g., the prefix "0.0.0.0/0") for the active service appliance. For example, if service appliance 140 is active, traffic module 112 may configure the static default route for service appliance 140 in the routing table of PE router 208. Accordingly, in this example, the static default route may effectively point and/or lead to service appliance 140 on PE router 208. In another example, if service appliance 142 is active, traffic module 112 may configure the static default route for service appliance 142 in the routing table of PE router 210. Accordingly, in this example, the static default route may effectively point and/or lead to service appliance 142 on PE router 210.

Returning to FIG. 3, at step 320 one or more of the systems described herein may inspect the routing table of the PE router for the installation of the address of the active service appliance. For example, inspection module 106 may, as part of PE router 208 or 210 in FIG. 2, inspect the corresponding routing table for the installation of the address of the active service appliance. In this example, the address of the active service appliance may be included in and/or specified by a VIP host route stored and/or installed in the corresponding routing table. The VIP host route may point to and/or identify the local access interface connected to the active service appliance as the corresponding next hop. Accordingly, the address of the active service appliance may have its next hop to the local access interface connecting to the active service appliance.

The systems described herein may perform step 320 in a variety of ways and/or contexts. In some examples, inspection module 106 may search the corresponding routing table for the VIP host route that leads to the active service appliance. In one example, if searching the routing table of the PE router connected to the active service appliance, inspection module 106 may find and/or identify the VIP host route for the active service appliance. For example, if service appliance 142 in FIG. 2 is active, inspection module 106 may find and/or identify the VIP host route for service appliance 142 in routing table 120 of PE router 210. However, in this example, inspection module 106 may be unable to find and/or identify the VIP host route for service appliance 140 or 142 in the routing table of PE router 208, as this VIP host route was not learned and/or installed by PE router 208.

Returning to FIG. 3, at step 330 one or more of the systems described herein may determine, based at least in part on the inspection of the routing table, that the address of the active service appliance is installed in the routing table. For example, determination module 108 may, as part of PE router 208 or 210 in FIG. 2, determine that the address of the active service appliance is installed in the corresponding routing table based at least in part on the inspection. As described above, the address of the active service appliance may be included in and/or specified by a VIP host route stored and/or installed in the corresponding routing table. Additionally or alternatively, the address of the active service appliance may have its next hop to the local access interface connecting to the active service appliance.

The systems described herein may perform step 330 in a variety of ways and/or contexts. In some examples, during the inspection, determination module 108 may search for the address of the active service appliance in a VIP host route installed in the corresponding routing table. In one example, if the inspection is performed on the routing table of the PE router connected to the active service appliance, determination module 108 may find and/or identify the address of the active service appliance in the VIP host route. For example, if service appliance 142 in FIG. 2 is active, determination module 108 may find and/or identify the address of service appliance 142 in the VIP host route. Additionally or alternatively, determination module 108 may find and/or identify the local access interface connected to the active service appliance as the corresponding next hop in the VIP host route. However, in this example, inspection module 106 may be unable to find and/or identify the address of service appliance 140 or 142 in a VIP host route on PE router 208, as PE router 208 has neither learned nor installed such a VIP host route in accordance with conditional advertisement policy 134.

Returning to FIG. 3, at step 340 one or more of the systems described herein may determine that the PE router has satisfied the conditional advertisement policy due at least in part to the address of the active service appliance being installed in the routing table. For example, determination module 108 may, as part of PE router 208 or 210 in FIG. 2, determine that the PE router has satisfied conditional advertisement policy 134 due at least in part to the address of the active service appliance (with, e.g., its next hop to the local access interface connecting to the active service appliance) being installed in the routing table. In this example, conditional advertisement policy 134 may require the presence, existence, and/or detection of the address of the active service appliance (with, e.g., its next hop to the local access interface connecting to the active service appliance) within the routing table of a PE router before that PE router is allowed to advertise the static default route and/or prefix through the EVPN type-5 route. In other words, conditional advertisement policy 134 may suppress the static default route and/or prefix from advertisement unless the PE router has installed that the VIP host route for the active service appliance into the corresponding routing table.

The systems described herein may perform step 340 in a variety of ways and/or contexts. In some examples, determination module 108 may ensure that all necessary conditions defined by conditional advertisement policy 134 have been met and/or satisfied before PE router 208 or 210 is permitted to advertise the static default route and/or prefix through the EVPN type-5 route. In other words, if one or more conditions defined and/or required by conditional advertisement policy 134 are not met or satisfied, determination module 108 may determine that PE router 208 or 210 has failed to comply with conditional advertisement policy 134. As a result of such non-compliance, PE router 208 or 210 may be unable to advertise the static default route and/or prefix through the EVPN type-5 route.

In some examples, determination module 108 may determine that PE router 208 or 210 is connected to the active service appliance if the address of the active service appliance is installed in the PE router's routing table. Conversely, determination module 108 may determine that PE router 208 or 210 is connected to the backup service appliance if the address of the active or backup service appliance is not installed in the PE router's routing table.

Returning to FIG. 3, at step 350 one or more of the systems described herein may direct the PE router to advertise the route for the active service appliance to the additional PE routers of the network in response to determining that the PE router has satisfied the conditional advertisement policy. For example, advertising module 110 may, as part of PE router 208 or 210 in FIG. 2, direct the PE router to advertise route 220 for the active service appliance to the additional PE routers of the network. In this example, advertising module 110 may initiate this advertising process in response to the determination that the PE router has satisfied conditional advertisement policy 134.

The systems described herein may perform step 350 in a variety of ways and/or contexts. In some examples, advertising module 110 may advertise the static default route and/or prefix through the EVPN type-5 route. For example, if service appliance 142 in FIG. 2 is active, advertising module 110 may direct PE router 210 to advertise the static default route and/or prefix for service appliance 142 through the EVPN type-5 route. However, in this example, suppression module 116 may direct PE router 208 to refrain from advertising the static default route and/or prefix for service appliance 140 or 142 because PE router 208 is connected to the standby service appliance.

In another example, if service appliance 140 in FIG. 2 is active, advertising module 110 may direct PE router 208 to advertise the static default route and/or prefix for service appliance 140 through the EVPN type-5 route. However, in this example, suppression module 116 may direct PE router 210 to refrain from advertising the static default route and/or prefix for service appliance 140 or 142 because PE router 210 is connected to the standby service appliance.

In some examples, if service appliance 140 in FIG. 2 is active, PE router 208 may receive traffic directed to service appliance 140 from one or more of the additional PE routers. In one example, a remote PE router may forward traffic to service appliance 140 based at least in part on the EVPN type-5 route advertised by PE router 208. In this example, such traffic may traverse from the remote PE router to PE router 208 via the optimal path, thereby bypassing PE router 210 on its way. Upon arriving at PE router 208, traffic module 112 may receive the traffic and then forward the same to service appliance 140 for service and/or processing. Once the traffic has reached service appliance 140, service module 114 may perform a certain service and/or function (e.g., firewall and/or load-balancing services) on and/or in connection with the traffic.

In some examples, the receiving PE router may be running EVPN. However, the receiving PE router may or may not run, serve, and/or be configured as part of the same bridge domain as the advertising PE router that advertised the static default route. In one example, the receiving PE router may include and/or represent a Layer 3 PE gateway that supports only EVPN IP prefixes through EVPN type-5. Accordingly, in this example, the receiving PE router may be unable to support EVPN Layer 2 bridge domain functionality, such as various Virtual LAN (VLAN) services defined in the Internet Engineering Task Force's (IETF's) RFC 7432, published February of 2015, titled "BGP MPLS-Based Ethernet VPN".

In some examples, one or more of the systems described herein may detect a failure that inhibits one or more functionalities of the active service appliance. For example, if service appliance 140 in FIG. 2 is active at a given time, service appliance 140 may experience a failure and/or go offline for one reason or another. In this example, the failure may inhibit the functionalities and/or services provided by service appliance 140. PE router 208 may detect this failure and then notify PE router 210 of the same.

In response to the failure, PE router 210 may activate service appliance 142 to assume responsibility for providing such functionalities and/or services on behalf of the cluster of active-standby service appliances. PE router 210 may then learn the MAC address and/or VIP address of service appliance 142 locally from an access interface (per, e.g., certain EVPN processes). Upon learning the MAC address and/or VIP address of service appliance 142 in this way, PE router 210 may install the VIP host route and/or address for service appliance 142 in routing table 120.

In one example, PE router 210 may advertise an EVPN type-2 route to PE router 208. However, PE router 208 may disregard and/or suppress the EVPN type-2 route advertised by PE router 210 based at least in part on conditional advertisement policy 134. As a result, PE router 208 may fail and/or refuse to learn or install the VIP host route and/or address for service appliance 142. Additionally or Alternatively, PE router 208 may prevent the address of service appliance 142 from being installed in its routing table despite learning the address of service appliance 142 via the EVPN type-2 route advertised by PE router 210.

Additionally or alternatively, PE router 208 may withdraw the EVPN type-2 route that PE router 208 previously advertised. PE router 208 may also withdraw and/or remove, from its routing table, the VIP host route for service appliance 140. By doing so, PE router 208 may also trigger and/or initiate the withdrawal of its EVPN type-5 route for the static default route that points and/or leads to service appliance 140.

In some examples, one or more of modules 102 may direct and/or cause PE router 210 to perform one or more of the various tasks described above in connection with PE router 208. For example, inspection module 106 may inspect routing table 120 of PE router 210 for the installation of at least one address (e.g., MAC address and/or VIP address) of service appliance 142. In this example, determination module 108 may determine that the address of service appliance 142 is installed in routing table 120 of PE router 210 based at least in part on the inspection.

Additionally or alternatively, determination module 108 may determine that PE router 210 has satisfied and/or complies with conditional advertisement policy 134 due at least in part to the address of service appliance 142 being installed in routing table 120. In response, advertising module 110 may direct PE router 210 to advertise route 220 for service appliance 142 to the additional PE routers of the network. However, because service appliance 140 is not longer active, suppression module 116 may direct PE router 208 to refrain from advertising the EVPN type-5 route for service appliance 140 or 142 to the additional PE routers of the network.

In some examples, if service appliance 142 in FIG. 2 is active, PE router 210 may receive traffic directed to service appliance 142 from one or more of the additional PE routers. In one example, a remote PE router may forward traffic to service appliance 142 based at least in part on the EVPN type-5 route advertised by PE router 210. In this example, such traffic may traverse from the remote PE router to PE router 210 via the optimal path, thereby bypassing PE router 208 on its way. Upon arriving at PE router 210, traffic module 112 may receive the traffic and then forward the same to service appliance 142 for service and/or processing. Once the traffic has reached service appliance 142, service module 114 may perform a certain service and/or function (e.g., firewall and/or load-balancing services) on and/or in connection with the traffic.

FIG. 4 is an illustration of an exemplary system 400 that includes PE routers 208 and 210 as well as PE routers 408(1)-(N). In some examples, system 400 may include and/or represent an EVPN overlay network. As illustrated in FIG. 4, PE router 208 may be connected to service appliance 140, and PE router 210 may be connected to service appliance 142. In addition, PE routers 408(1)-(N) may be connected to computing devices 440(1)-(N), respectively. Examples of computing devices 440(1)-(N) include, without limitation, routers (such as PE routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

In one example, service appliances 140 and 142 may be grouped as a cluster of active-standby of service appliances. In this example, service appliance 140 may be configured and/or programmed to serve as the active service appliance, whereas service appliance 142 may be configured and/or programmed to serve as the standby service appliance. In this scenario, shortest path forwarding may involve sending traffic directly from PE routers 408(1)-(N) to PE router 208 connected to the active service appliance instead of sending traffic from PE routers 408(1)-(N) to PE router 210 connected to the standby service appliance and then forwarding the same to PE router 208. Such shortest path forwarding to PE router 208 may be achieved by having only PE router 208 advertise the static default route to PE routers 408(1)-(N). Accordingly, PE router 210 connected to service appliance 142 may suppress the static default route advertisement.

In FIG. 4, system 400 may implement conditional advertisement policy 134 to control the advertisement and suppression of the static default route through the EVPN type-5 route. In one example, conditional advertisement policy 134 may cause PE routers 208 and 210 to check for the existence of the VIP host route of service appliances 140 and 142, respectively, in the tenant Layer 3 IP VRF table. In this example, only the PE router whose tenant Layer 3 IP VRF table includes the VIP host route of the active service appliance may be allowed to originate and/or advertise the EVPN type-5 route for the static default route (e.g., the prefix "0.0.0.0/0") to PE routers 408(1)-(N). The PE router that is connected to the backup service appliance may suppress the installation of the VIP host route in the tenant's Layer 3 IP VRF table even if that VIP address of the active service appliance is learned from an EVPN type-2 MAC and VIP route.

In some examples, after learning the MAC and VIP addresses of service appliance locally, PE router 208 may install the VIP host route in the tenant's Layer 3 IP VRF table. In accordance with conditional advertisement policy 134, PE router 208 may check for the existence of the VIP host route in the tenant's Layer 3 IP VRF table. The installation of the VIP host route in the tenant's Layer 3 IP VRF table may trigger and/or initiate the advertisement of the EVPN type-5 route for the static default route to PE routers 408(1)-(N). Accordingly, because PE router 208 is connected to the active service appliance whose VIP host route is installed in the tenant's Layer 3 IP VRF table, PE router 208 may advertise the EVPN type-5 route for the static default route. However, because PE router 210 is connected to the backup service appliance whose VIP host route is not installed in the tenant's Layer 3 IP VRF table, PE router 210 may suppress and/or refrain from advertising the EVPN type-5 route for the static default route.

After learning the EVPN type-5 route from PE router 208, PE routers 408(1)-(N) may direct and/or forward traffic to service appliance 140 via the static default route. In one example, the static default route advertised to PE routers 408(1)-(N) by PE router 208 may cause the traffic to traverse to PE router 208 via optimal path 404. In this example, optimal path 404 may lead such traffic to PE router 208 without ever passing through PE router 210. Optimal path 404 may be more efficient than suboptimal path 406, which leads such traffic through PE router 210 unnecessarily. Accordingly, optimal path 404 may represent the shortest path forwarding for such traffic.

In some examples, if the cluster fails over from service appliance 140 to service appliance 142, PE router 210 may learn the MAC and VIP addresses of service appliance 142. In one example, PE router 210 may originate the MAC and VIP addresses of service appliance 142, which triggers and/or causes PE router 208 to (1) withdraw the VIP host route in its tenant IP-VRF table, (2) withdraw the EVPN type-5 route for the static default route, and (3) withdraw the EVPN type-2 route that PE router 208 previously advertised. PE router 210 may also install the VIP host route of service appliance 142 into the tenant's VIP IP VRF table and then begin to advertise its EVPN type-5 route for the static default route to PE routers 408(1)-(N).

FIG. 5 is an illustration of an exemplary code snippet 500 that facilitates performing inspections as to whether conditional advertisement policy 134 has been satisfied. As illustrated in FIG. 5, code snippet 500 may cause PE router 208 or 210 to check whether the VIP host route of the service appliance is installed by EVPN in the IP VRF table. In this example, if the VIP host route is installed in the IP VRF table of PE router 208 or 210, that PE router may advertise the EVPN type-5 route for the static default route (e.g., the prefix "0.0.0.0/0"). However, if the VIP host route is not installed in the IP VRF table of PE router 208 or 210, that PE router may do nothing in the way of advertising. In other words, that PE router may stay silent, thereby refraining from advertising the EVPN type-5 route for the static default route.

Figure 6:
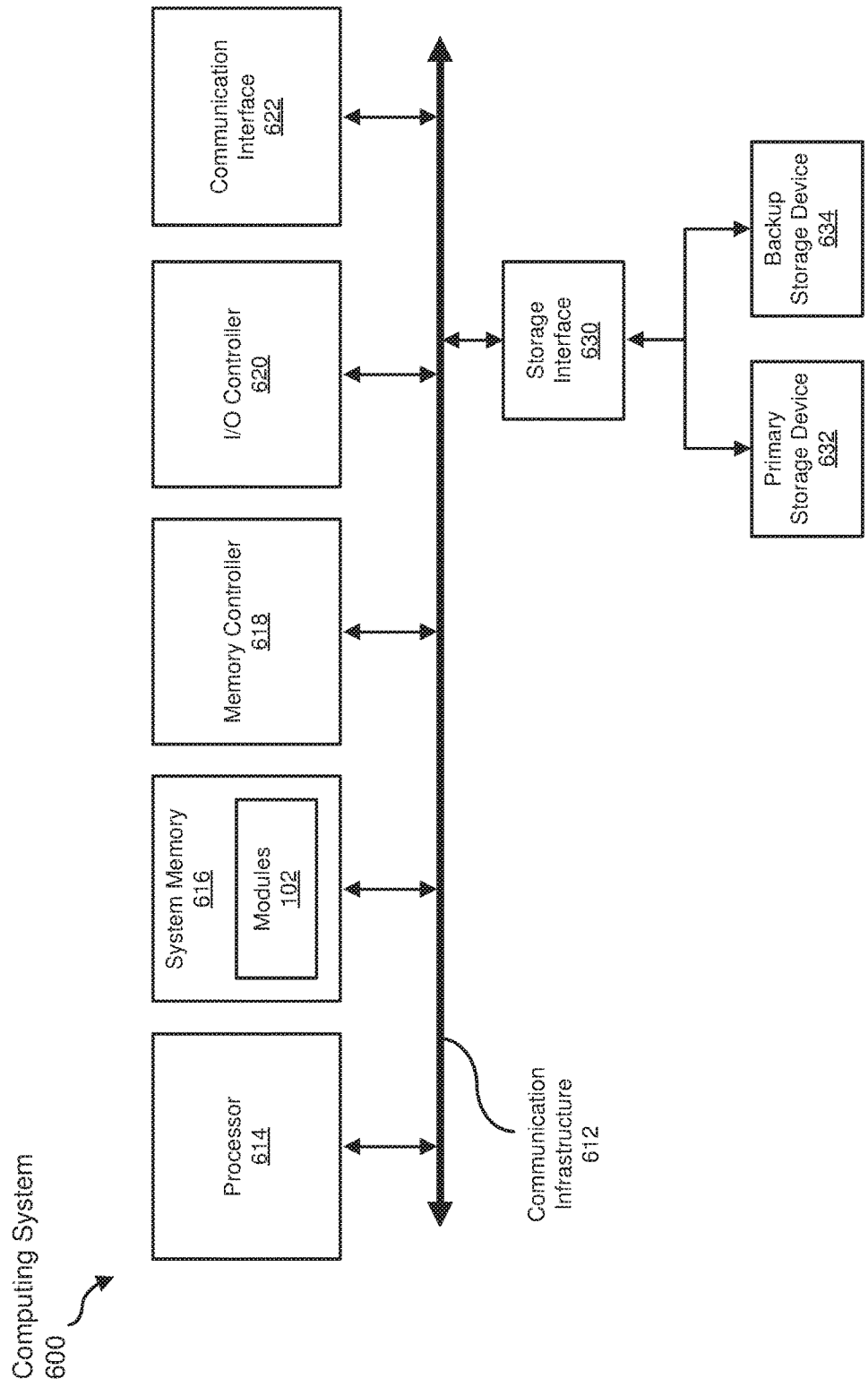
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    identifying, by a provider edge (PE) router of a network, a conditional advertisement policy that requires installation of at least one address of an active service appliance within a routing table such that:
        if the conditional advertisement policy is satisfied, the PE router is directed to advertise a route for the active service appliance to one or more additional PE routers of the network; and
        if the conditional advertisement is not satisfied, the PE router is directed to refrain from advertising any route for the active service appliance to the additional PE routers of the network;
    inspecting the routing table of the PE router for the installation of the address of the active service appliance;
    determining, based at least in part on the inspection of the routing table, that the address of the active service appliance is installed in the routing table;
    determining that the PE router has satisfied the conditional advertisement policy due at least in part to the address of the active service appliance being installed in the routing table; and
    in response to determining that the PE router has satisfied the conditional advertisement policy, directing the PE router to advertise the route for the active service appliance to the additional PE routers of the network.

2. The method of claim 1, wherein the active service appliance is connected to the PE router; and
    further comprising:
        learning, by the PE router, the address of the active service appliance connected to the PE router via a local access interface; and upon learning the address of the active service appliance, installing the address of the active service appliance into the routing table of the PE router.

3. The method of claim 1, further comprising configuring, by the PE router, a static default route as the route for the active service appliance.

4. The method of claim 1, further comprising:
inspecting, at another PE router of the network, a routing table of the another PE router for the installation of the address of the active service appliance;
determining, based at least in part on the inspection of the routing table of the another PE router, that the address of the active service appliance is not installed in the routing table of the another PE router;
determining that the another PE router has not satisfied the conditional advertisement policy due at least in part to the address of the active service appliance not being installed in the routing table; and
in response to determining that the another PE router has not satisfied the conditional advertisement policy, directing the another PE router to refrain from advertising any route for the active service appliance to the additional PE routers of the network.

5. The method of claim 4, wherein the another PE router is connected to a backup service appliance that is currently inactive; and
further comprising:
determining, based at least in part on the inspection of the routing table of the another PE router, that at least one address of the backup service appliance is not installed in the routing table of the another PE router; and
determining that the another PE router is connected to the backup service appliance, as opposed to being connected to the active service appliance, due at least in part to the address of the backup service appliance not being installed in the routing table; and
wherein determining that the another PE router has not satisfied the conditional advertisement policy comprises determining that the another PE router has not satisfied the conditional advertisement policy due at least in part to the address of the backup service appliance not being installed in the routing table.

6. The method of claim 5, wherein further comprising, in response to determining that the another PE router has not satisfied the conditional advertisement policy, directing the another PE router to refrain from advertising any route for the backup service appliance to the additional PE routers of the network.

7. The method of claim 4, further comprising preventing the another PE router from installing the address of the active service appliance into the routing table of the another PE router despite learning the address of the active service appliance via another route advertised by the PE router.

8. The method of claim 7, wherein the another route advertised by the PE router comprises an Ethernet Virtual Private Network (EVPN) type-2 route.

9. The method of claim 1, further comprising:
detecting a failure that inhibits a functionality of the active service appliance; and
in response to detecting the failure, activating a backup service appliance to assume responsibility for providing the functionality to the additional PE routers of the network.

10. The method of claim 9, further comprising:
inspecting, at another PE router of the network that is connected to the backup service appliance, a routing table of the another PE router for the installation of at least one address of the backup service appliance;
determining, based at least in part on the inspection of the routing table of the another PE router, that the address of the backup service appliance is installed in the routing table of the another PE router;
determining that the another PE router has satisfied the conditional advertisement policy due at least in part to the address of the backup service appliance being installed in the routing table; and
in response to determining that the another PE router has satisfied the conditional advertisement policy, directing the another PE router to advertise a route for the backup service appliance to the additional PE routers of the network.

11. The method of claim 10, further comprising:
receiving, at the another PE router from one of the additional PE routers, traffic directed to the backup service appliance based at least in part on the route advertised for the active service appliance, wherein the route advertised for the active service appliance caused the traffic to traverse from the one of the additional PE routers to the another PE router via an optimal path within the network; and
forwarding, by the PE router, the traffic to the active service appliance based at least in part on the route to enable the active service appliance to perform at least one service in connection with the traffic.

12. The method of claim 11, further comprising performing, by the active service appliance, the service on the traffic forwarded to the active service appliance from the PE router.

13. The method of claim 9, further comprising, in response to activating the backup service appliance to assume responsibility for providing the functionality to the additional PE routers of the network, directing the PE router to refrain from advertising any route for the active service appliance to the additional PE routers of the network.

14. The method of claim 1, further comprising:
receiving, at the PE router from one of the additional PE routers, traffic directed to the active service appliance based at least in part on the route advertised for the active service appliance, wherein the route advertised for the active service appliance caused the traffic to traverse from the one of the additional PE routers to the PE router via an optimal path within the network; and
forwarding, by the PE router, the traffic to the active service appliance based at least in part on the route to enable the active service appliance to perform at least one service in connection with the traffic.

15. The method of claim 14, further comprising performing, by the active service appliance, the service on the traffic forwarded to the active service appliance from the PE router.

16. The method of claim 1, wherein the routing table comprises a network layer Virtual Routing and Forwarding (VRF) table.

17. The method of claim 1, wherein the route advertised for the active service appliance comprises an Ethernet Virtual Private Network (EVPN) type-5 route.

18. The method of claim 1, wherein:
the active service appliance comprises a firewall; and
the address of the active service appliance comprises at least one of:
a Media Access Control (MAC) address of the firewall; and
a Virtual Internet Protocol (VIP) address of the firewall.

19. A system comprising:
an identification module, stored in memory at a provider edge (PE) router of a network, that identifies a conditional advertisement policy that requires installation of at least one address of an active service appliance within a routing table such that:
  if the conditional advertisement policy is satisfied, the PE router is directed to advertise a route for the active service appliance to one or more additional PE routers of the network; and
  if the conditional advertisement is not satisfied, the PE router is directed to refrain from advertising any route for the active service appliance to the additional PE routers of the network;
an inspection module, stored in memory at the PE router, that inspects the routing table of the PE router for the installation of the address of the active service appliance;
a determination module, stored in memory at the PE router, that:
  determining, based at least in part on the inspection of the routing table, that the address of the active service appliance is installed in the routing table; and
  determining that the PE router has satisfied the conditional advertisement policy due at least in part to the address of the active service appliance being installed in the routing table;
an advertising module, stored in memory at the PE router, that advertises the route for the active service appliance to the additional PE routers; and
at least one physical processing device configured to execute the identification module, the inspection module, the determination module, and the advertisement module.

20. An apparatus comprising:
a storage device that stores a conditional advertisement policy that requires installation of at least one address of an active service appliance within a routing table such that:
  if the conditional advertisement policy is satisfied, a provider edge (PE) router of a network is directed to advertise a route for the active service appliance to one or more additional PE routers of the network; and
  if the conditional advertisement is not satisfied, the PE router is directed to refrain from advertising any route for the active service appliance to the additional PE routers of the network; and
at least one physical processing device communicatively coupled to the storage device, wherein the physical processing device:
  identifies the conditional advertisement policy stored in the storage device;
  inspects the routing table for the installation of the address of the active service appliance;
  determines, based at least in part on the inspection of the routing table, that the address of the active service appliance is installed in the routing table;
  determines that the conditional advertisement policy is satisfied due at least in part to the address of the active service appliance being installed in the routing table; and
  in response to determining that the conditional advertisement policy is satisfied, advertising the route for the active service appliance to the additional PE routers of the network.

* * * * *